Oct. 3, 1967    F. A. GLOMB ETAL    3,344,879
WHEEL DRIVE MECHANISM
Original Filed April 27, 1961    4 Sheets-Sheet 1
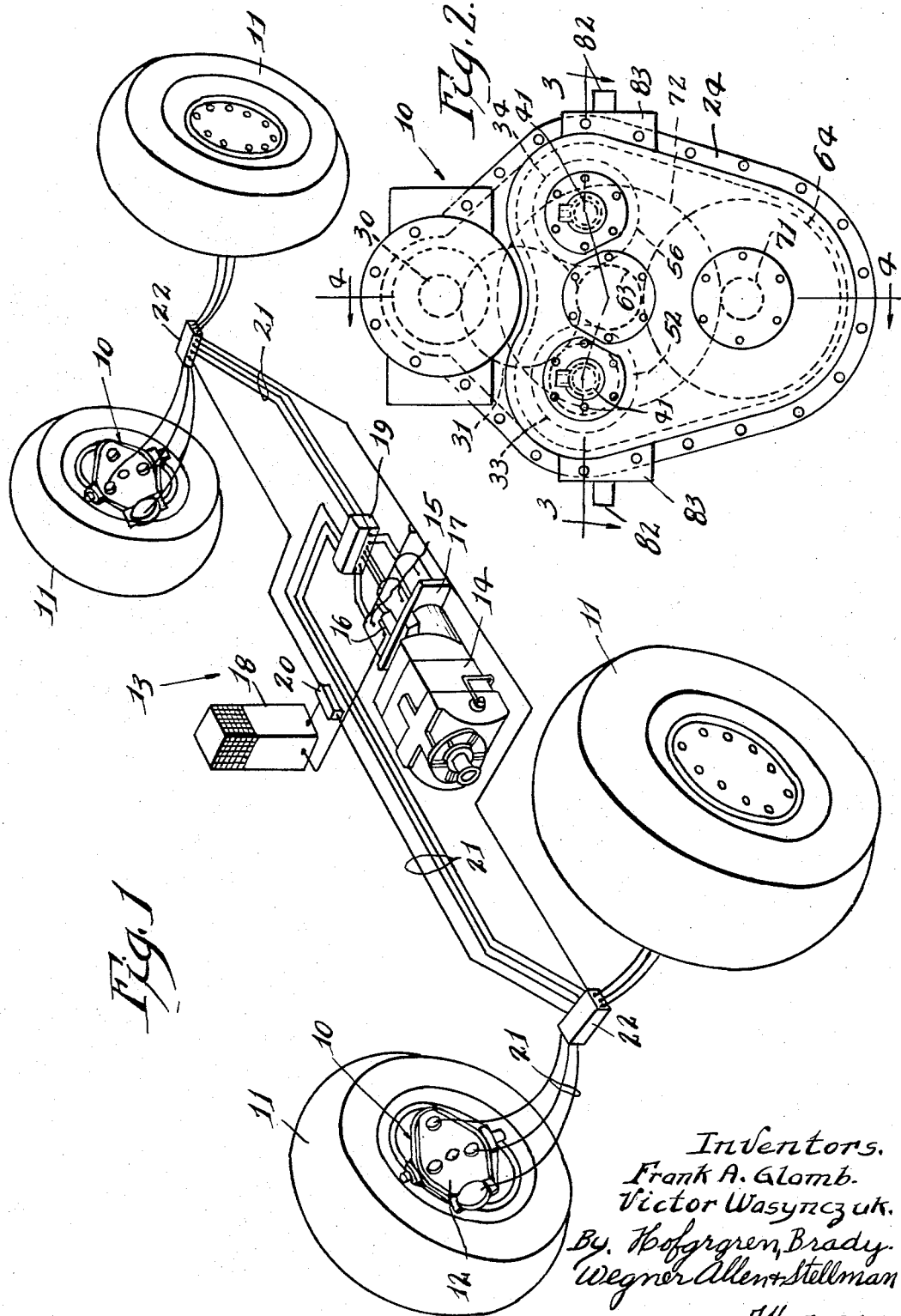
Inventors.
Frank A. Glomb.
Victor Wasynczuk.
By. Hofgren, Brady.
Wegner Allen + Stellman
Attorneys.

United States Patent Office 3,344,879
Patented Oct. 3, 1967

3,344,879
WHEEL DRIVE MECHANISM
Frank A. Glomb, Glenwood, and Victor Wasynczuk, Chicago, Ill., assignors to Barnes & Reinecke, Inc., a corporation of Delaware
Continuation of application Ser. No. 106,015, Apr. 27, 1961. This application Dec. 3, 1965, Ser. No. 517,141
9 Claims. (Cl. 180—55)

This application comprises a continuation of our copending application Ser. No. 106,015, filed Apr. 27, 1961, now abandoned, assigned to the assignee hereof.

This invention relates to drive apparatus and in particular to multi-torque drive apparatus for use such as in vehicle wheel drives.

One improved method of driving a wheeled vehicle is to provide a drive means, such as a hydraulic motor, at each wheel to be driven by means of hydraulic fluid delivered thereto from a suitable pump carried by the vehicle. The present invention is concerned with such a wheel drive apparatus wherein transmission means are provided at each wheel for providing controlled variable speed and torque drive of the wheel.

Thus, a principal feature of the present invention is the provision of a new and improved wheel drive apparatus.

Another feature of the invention is the provision of such wheel drive apparatus including an improved transmission mechanism for providing a controlled variable speed and torque drive.

A further object of the invention is to provide such a wheel drive apparatus arranged to provide self-braking.

Still another object of the invention is to provide such a wheel drive apparatus including a drive means, a pair of clutches each having an input portion and an output portion, gear means connected to the drive means for concurrently driving the input portions at different speeds, means for selectively arranging the output portions to be driven by the input portions individually or concurrently, and means connected to the output portions to be driven thereby at preselected speeds when the clutches are arranged for driving individually either of the output portions and to be urged against movement by the output portions when the clutches are arranged for concurrently driving the output portions.

A yet further object of the invention is to provide such a wheel drive apparatus having a simple economical construction and providing facilitated maintenance and operation.

Other objects and advantages of the invention will be apparent from the following description, taken in connection with the accompanying drawings wherein:

FIGURE 1 is a schematic perspective view of a portion of a wheeled vehicle provided with wheel drive apparatus embodying the invention;

FIGURE 2 is a front elevation of the wheel drive apparatus;

Figure 3:
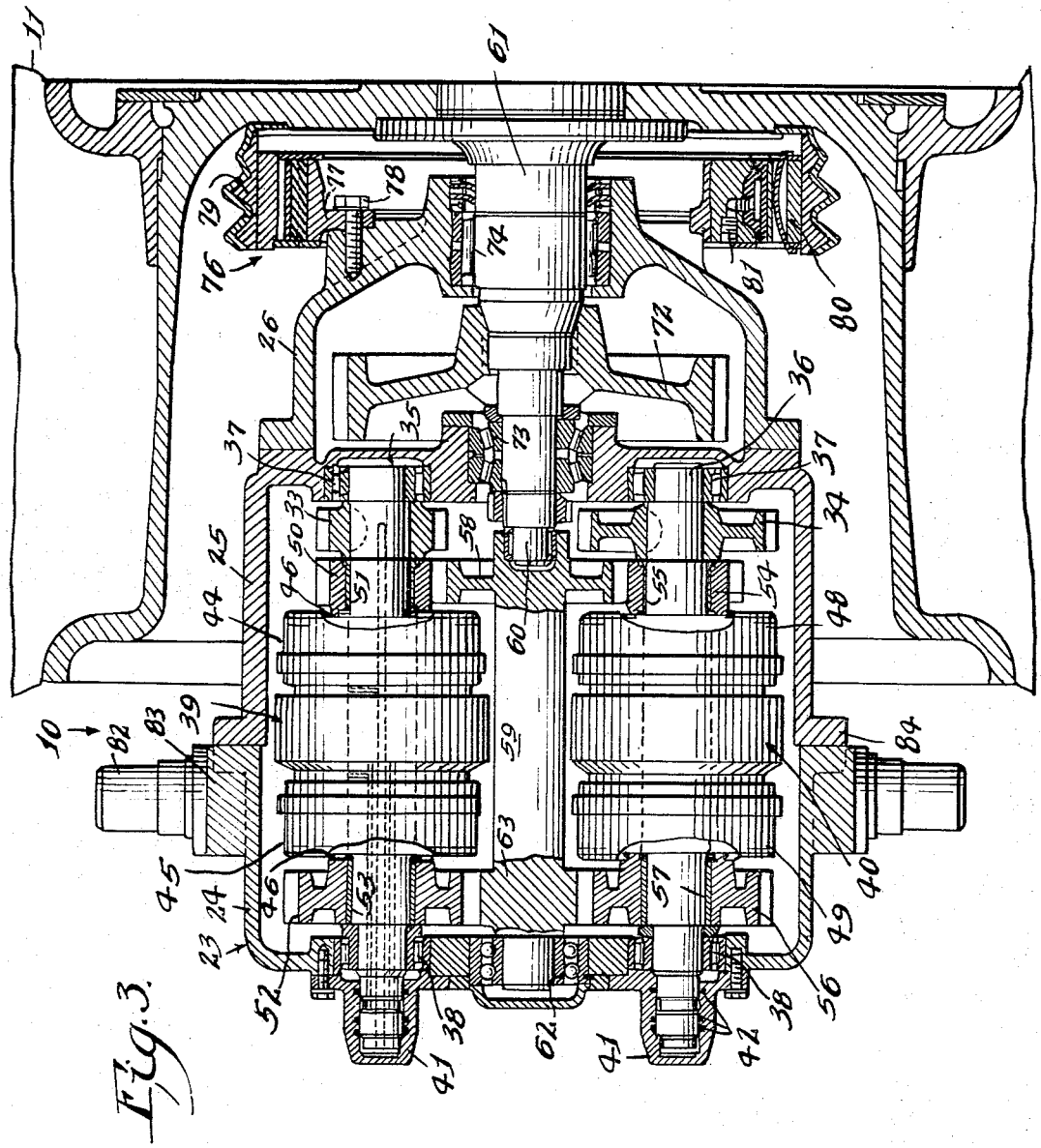
FIGURE 3 is a vertical section thereof taken substantially along the line 3—3 of FIGURE 2.

In the exemplary embodiment of the invention as shown in the drawings, a plurality of wheel drive apparatuses generally designated 10 are associated one each with each of the wheels 11 of a suitable vehicle (not shown). Each wheel drive apparatus 10 includes a drive means such as motor 12. In illustrating the invention, motor 12 is shown to comprise a hydraulic motor of conventional construction, controlledly driven by suitable conventional hydrostatic drive apparatus generally designated 13. As will be obvious to one skilled in the art, however, the drive means 12 of apparatus 10 may alternatively comprise an electric motor for operation by suitable associated electric control means or may comprise a mechanical input connection as desired.

As shown in FIGURE 1, power means 13 may comprise a suitable drive engine 14 operating a plurality of conventional hydrostatic supply pumps 15 and a clutch supply pump 16 through a suitable reduction gear box 17. A conventional oil supply tank and cooler device 18 is associated with the supply pumps and motors. A suitable selector and control valve device 19 is provided. The hydraulic fluid is delivered through valve device 19 to all or two of the wheel drive devices 10 through suitable associated conduits generally designated 21 and conventional distribution manifolds 22. The hydrostatic supply pumps may alternatively comprise fixed displacement pumps and variable displacement pumps and the motors 12 may alternatively comprise fixed displacement motors and variable displacement motors as desired.

Figure 4:
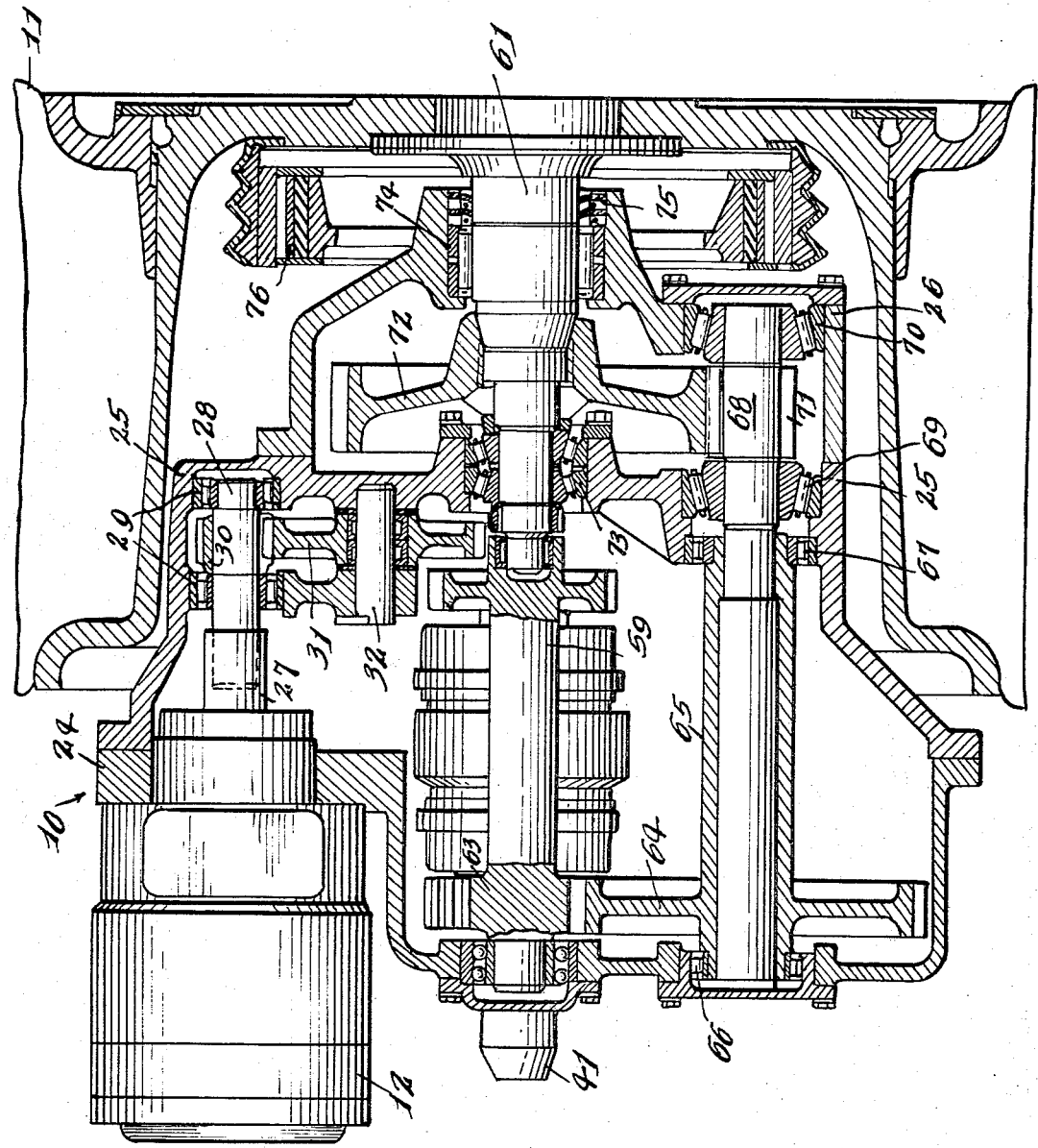
FIGURE 4 is a horizontal section thereof taken substantially along the line 4—4 of FIGURE 2.

Referring now more specifically to FIGURES 2 through 4, wheel drive apparatus 10 may be seen to comprise a tripartite housing 23 having a forward portion 24, a mid-portion 25, and a rear portion 26. Preferably, a substantial portion of the housing is disposed in a recess provided by a central annular flange on wheel 11 extending axially from the wheel hub. As best seen in FIGURE 4, hydraulic motor 12 is carried by the forward portion 24 of the housing and is provided with a drive shaft 27 to which is coaxially splined a drive pinion shaft 28 journalled in suitable roller bearings 29 carried by housing portion 25. A drive pinion 30 is formed integral with shaft 28, herein pinion 30 illustratively comprises a 15-tooth pinion. An idler gear 31, illustratively having 37 teeth, is journalled on a stub shaft 32 fixedly secured to housing portion 25 and meshes with pinion 30. Idler gear 31, in turn, meshes with a pair of gears 33 and 34 fixedly secured to a pair of clutch shafts 35 and 36 respectively as shown in FIGURE 3, gear 33 having 23 teeth and gear 34 having 46 teeth in the illustrated embodiment. The shafts 35 and 36 are journalled at one end in suitable roller bearings 37 in housing portion 25 and at the opposite end in suitable bearings 38 in housing portion 24. Shafts 35 and 36 are hollow and are arranged to deliver hydraulic fluid to a pair of conventional wet type double acting clutches 39 and 40 associated respectively therewith, the hydraulic fluid being delivered to the interior of the hollow shafts through a suitable connecting fitting 41 at the forward end of each shaft. As best seen in FIGURE 3, the shafts are sealed to the connecting fittings by suitable means such as O-rings 42.

As best seen in FIGURE 3, clutch 39 includes input portions secured against rotation relative to shaft 35, and a pair of opposed clutch drums 44 and 45 freely rotatable on shaft 35 to be selectively driven by the input portions. Similarly, clutch 40 includes input portions fixed against rotation on shaft 36 and a pair of opposed clutch drums 48 and 49 freely rotatable thereon. Clutch drum 44 is secured as by welding to a gear 50 illustratively having 17 teeth journalled on shaft 35 by suitable means such as bushing 51. Clutch drum 45 is fixedly secured as by welding to a gear 52, illustratively having 27 teeth, and journalled on shaft 35 by means of a bushing 53. Clutch drum 48 is fixedly secured as by welding to a gear 54, illustratively having 17 teeth, and journalled on shaft 36 by means of bushing 55. Clutch drum 49 is fixedly secured to a gear 56 illustratively having 27 teeth and journalled on shaft 36 by a bushing 57.

Clutches 39 and 40 are arranged herein to drive selectively gears 50, 52, 54 and 56 by suitable hydraulic operation under control of fluid admitted through the input shaft to the clutch. Thus, clutch 39 may be operated selectively to drive drum 44 or drum 45 thereby selectively driving gear 50 or gear 52 as desired. Similarly, clutch 40 may be operated to drive selectively drum 48 or drum 49 to drive selectively gear 54 or gear 56.

As best seen in FIGURE 3, gears 50 and 54 mesh with a gear 58 formed integral with a gather shaft 59, gear 58 illustratively herein having 27 teeth. One end of gather shaft 59 is journalled on an inner end portion 60 of the wheel axle 61 and the other end of gather shaft 59 is journalled in a suitable bearing 62 carried by housing portion 24. Adjacent bearing 62, gather shaft 59 is provided with a second integral gear 63 meshing with gears 52 and 56, herein gear 63 is provided with 17 teeth.

Referring now more specifically to FIGURE 4, gear 63 may be seen to be in meshing engagement with a gear 64, herein illustratively having 51 teeth, formed integral with a hollow transfer shaft 65 journalled at one end in a suitable roller bearing 66 carried by housing portion 24 and at the other end in a suitable roller bearing 67 carried by housing portion 25. A drive pinion shaft 68 is splined to the transfer shaft 65 for coaxial rotation therewith and is journalled in suitable roller bearings 69 and 70 carried by housing portions 25 and 26, respectively. A drive pinion 71 formed integral with shaft 68, herein provided with 8 teeth, meshes with a bull gear 72, herein having 43 teeth, fixed to the wheel axle 61 comprising the output shaft of the apparatus 10. Wheel axle 61 is journalled in suitable roller bearings 73 carried by housing portion 25 and 74 carried by housing portion 26 and provided with suitable seals 75.

If desired, a hydraulic brake generally designated 76 may be associated with the apparatus 10 for braking the wheel 11. As shown in FIGURE 3, the brake 76 may comprise a conventional expandable shoe brake having an inner support 77 secured to housing portion 26 by suitable means such as bolts 78, and a drum portion 79 secured to the wheel 11. In this form of hydraulic brake, the shoe 80 comprises a hollow annular member expandable by means of hydraulic fluid admitted to the interior thereof as through passage 81.

Another feature of wheel drive apparatus 10 is the capability thereof to provide self-braking by suitable concurrent operation of the clutches 39 and 40. Thus, whenever it is desired to brake the wheel 11 by means of the clutches, both clutches are concurrently energized thereby providing different ratio gear trains between gathering shaft 59 and gear 31. Such gear trains can not be concurrently maintained and, thus, one or the other of the clutches slips to compensate for this difference in the gear ratios. The slippage forces cause the wheel 11 to stop, the energy thereof being dissipated as heat energy in the clutch.

Dynamic braking may be obtained by motoring the pump and restricting its output.

Where the apparatus 10 is to be associated with steerable wheels, suitable king pins 82 may be provided on pads 83 carried by housing portion 24. Where the wheels are not steerable, the apparatus may be secured to the vehicle frame by flanges 84 of housing portion 25 which may be suitably elongated for this purpose.

As discussed above, the hydrostactic supply pumps 15 may comprise fixed displacement pumps. Hydraulic motor 12 may comprise a fixed displacement motor. Thusly, apparatus 10 may provide a drive of the wheel 11 at four different preselected speeds depending on which clutch drum is being driven. Alternatively, where the pumps 15 comprise variable volume hydraulic pumps, four different speed ranges will be obtained from the apparatus 10 in lieu of the four different specific speeds obtained where the pumps are of the fixed displacement type. Still further, where the pumps 15 comprise variable volume pumps and the motor 12 comprise variable volume motors, the pumps and motors may be operated at maximum efficiency at all times notwithstanding a wide torque and speed requirement of the drive.

More specifically, where the gear teeth arrangements are as discussed above, the wheel drive apparatus 10 provides a gear ratio between shaft 28 and axle 61 of 75 to 1 where the gear 54 is selected, a gear ratio of 47 to 1 where the gear 50 is selected, a gear ratio of 30 to 1 where the gear 56 is selected, and a gear ratio of 19 to 1 where the gear 52 is selected. Illustratively, with such gear ratios, where the motor 12 comprises a 1,250 r.p.m. motor and the wheel 11 comprises a wheel having a nominal tire size of 24.00–29, vehicle speeds of 3.5, 5.7, 9.0 and 14.0 miles per hour are obtained. However, by simply providing all of the fluid to only two of the wheels 11 rather than to all four, the hydraulic motors of the selected wheels may be operated at 2,500 r.p.m., thus doubling the above indicated speeds.

Figure 5:
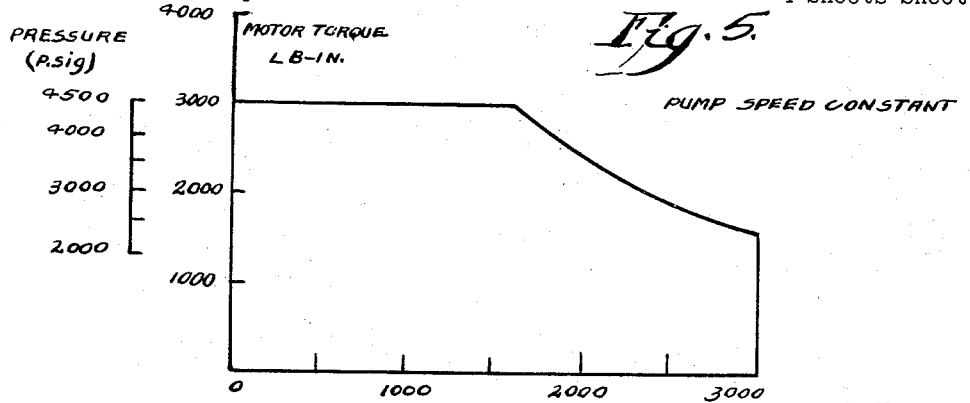
FIGURE 5 is a graph illustrating motor torque versus motor speed obtained by varying the pump cam angle.

In a hydrostatic transmission with a variable volume pump and a fixed displacement motor driving through a single speed reduction gearing, the torque output is proportional to the pressure and speed is proportional to the flow rate. In such a device, the speed range is controlled by setting the cam angle of the pump, as illustrated in the graph of FIGURE 5 and by varying the speed of the prime mover, but a serious problem is encountered in obtaining a wide speed range because there is only a narrow range in which a hydrostatic system works efficiently, as for example, approximately in the range of 1,500 to 3,000 r.p.m. in FIGURE 5. As illustrated the speed range ratio is approximately 2 to 1, and in a system using a variable volume pump and a variable volume motor, the ratio is only about 3 to 1.

Figure 6:
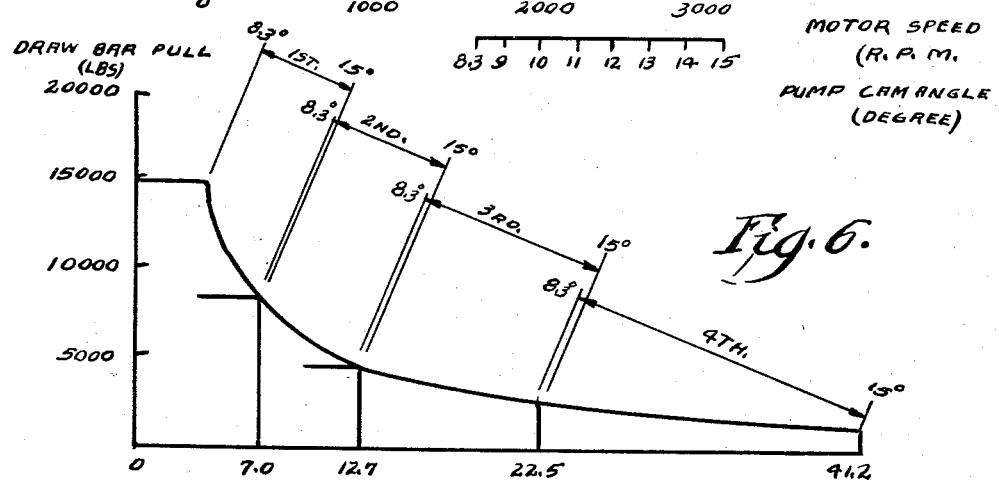
FIGURE 6 is a graph illustrating vehicle speed versus draw bar pull obtained with a drive embodying the present invention.

In a system embodying the principles of the present invention, the hydrostatic portion of the drive is always operated in the maximum efficiency range, and a wide range of speeds is provided in the mechanical gear ratio change mechanism, as illustrated in the graph of FIGURE 6. This may be accomplished in four steps while maintaining the hydrostatic transmission at maximum efficiency. As seen in FIGURE 6, a speed range from less than 3 to 7 is provided by using a first gear in the mechanical assembly while varying the pump cam angle through the range of maximum efficiency, a speed range from 7 to 12.7 is obtained by using a second gear while varying the pump cam angle, etc. In this manner, a speed range ratio of approximately 15 to 1 is provided while maintaining the hydrostatic transmission within the high efficiency range at any engine speed. Normally, the entire transmission is operated at maximum speed and minimum torque, and speed is reduced with a consequent torque increase where needed to accommodate the load.

Figure 7:
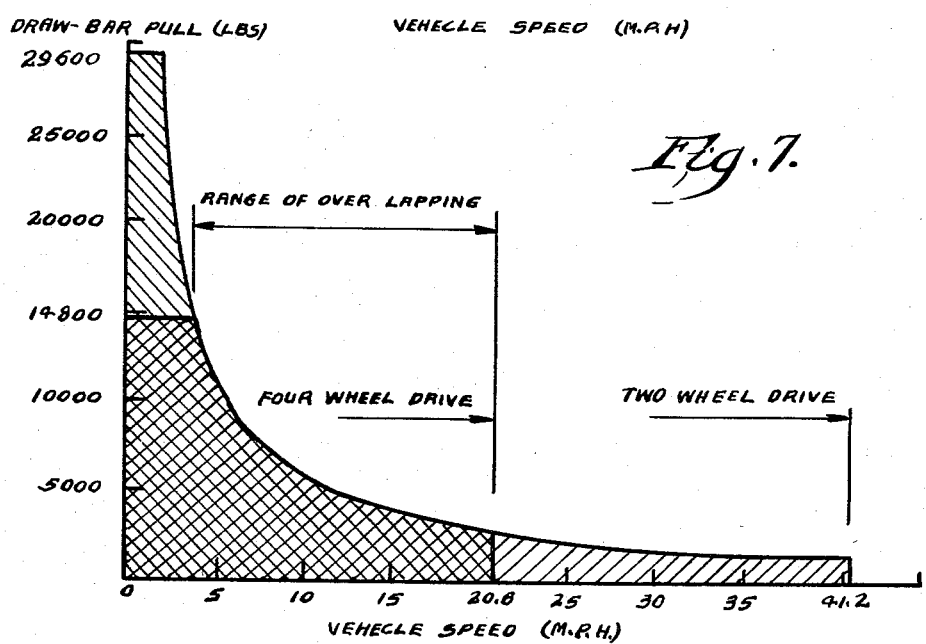
FIGURE 7 is a similar graph illustrating the conditions obtained by two-wheel drive and by four-wheel drive.

The control valve device 19 provides for driving either two of the wheel units 11 or, alternatively, all of the wheel units. The graph in FIGURE 6 illustrates the range of operation in the case of two wheel drive, providing a relatively high speed range and a low torque range as compared to the conditions illustrated in the graph of FIGURE 7 where all four wheels are driven, providing a relatively reduced speed range and an increased torque range.

The control valve device 19 provides for remote control of the gear ratio change clutches controlling the constantly meshed gears in each wheel assembly to selectively energize the desired clutch corresponding to a desired gear ratio and additionally provides for simultaneous control of two or more wheels to simultaneously vary the speed in each controlled wheel assembly while the vehicle is in motion under load without the need for stopping or synchronizing before shifting gears.

Another important feature of the present apparatus resides in the provision of a self-contained power wheel assembly including a wheel with a drive axle, gearing on the axle for driving it, gear ratio change mechanism supported on the axle, a hydraulic motor driving the gear mechanism and a housing mountable selectively at one or more positions on a single vehicle chassis or frame, dismountable and usable with other vehicles, all constructed around the centrally disposed wheel axle and adapted to be supplied by fluid under pressure from an engine driven pump integral with the vehicle or pump means associated with some other vehicle detachably connectable with the vehicle utilizing the wheel assembly.

While we have shown and described one embodiment of our invention, it is to be understood that it is capable of many modifications. Changes, therefore, in the construction and arrangement may be made without departing from the spirit and scope of the invention as defined in the appended claims.

We claim:

1. For use in a vehicle, a self-contained wheel and drive assembly comprising: a housing including means for fixed attachment of the housing to a vehicle; a motor carried by the housing for operation from a power source; a change speed gear transmission carried by the housing, said transmission having an input portion driven by said motor and an output portion; and means on said output portion for carrying a wheel for movably supporting the vehicle, said transmission comprising a pair of shafts concurrently driven by said motor at mutually different speeds, and a pair of clutches, one clutch having a first input driven by one of said shafts and an output selectively driveable by said input, and the other clutch having a second input driven by the other of said shafts and an output selectively driveable by said second input, said outputs driving said output portion of the transmission at preselected speeds when one of said clutches only is arranged for driving its output and to be urged against movement by said clutches when said clutches are arranged for concurrently driving said outputs.

2. For use in a vehicle, a self-contained wheel and drive assembly comprising: a housing; means for mounting the housing on a vehicle; a motor carried by the housing for operation from a power source; a change speed gear transmission carried by the housing, said transmission having an input portion driven by said motor and an output drive shaft journalled within said housing and having a free end projecting outwardly of said housing; a wheel including an annular hub; and means for supporting said wheel hub solely on said free end of said output drive shaft for movably supporting the vehicle, said output shaft further including a portion journalling a portion of said change speed gear transmission therein.

3. The self-contained wheel and drive assembly of claim 2 wherein said last-named means rigidly mounts said hub on said shaft.

4. The self-contained wheel and drive assembly of claim 2 wherein said drive shaft has an outer end at one end of said housing, and said wheel supporting means mounts said hub on said outer end to extend axially back from said outer end and annularly around said one end of the housing.

5. The self-contained wheel and drive assembly of claim 2 wherein said drive shaft has an outer end at one end of said housing, and said wheel supporting means mounts said hub on said outer end to extend axially back from said outer end and annularly around said one end of the housing, over one-half the length of the housing in the direction of the axis of said drive shaft being disposed radially inwardly of said hub.

6. The self-contained wheel and drive assembly of claim 2 wherein said transmission includes clutch means and means for selectively operating the clutch means to transmit power to said drive shaft from said motor and to brake rotation of the drive shaft.

7. The self-contained wheel and drive assembly of claim 2 wherein said drive shaft has an outer end at one end of said housing, said wheel supporting means mounting said hub on said outer end to extend axially back from said outer end and annularly around said one end of the housing, and further including an annular brake disposed coaxially of said drive shaft between said housing end and said hub.

8. The self-contained wheel and drive assembly of claim 7 wherein said wheel supporting means includes annular wall means extending radially outwardly from said drive shaft to said hub precluding access to said brake from axially outwardly thereof.

9. The self-contained wheel and drive assembly of claim 7 wherein said wheel supporting means includes annular wall means extending radially outwardly from said drive shaft to said hub precluding access to said brake from axially outwardly thereof, said brake including a portion carried by said wall means for rotation therewith.

References Cited

UNITED STATES PATENTS

| 1,642,103 | 9/1927 | Daubenmeyer | 180—66 |
| 1,924,363 | 8/1933 | Kanai | 180—31 |
| 2,039,513 | 5/1936 | Baker | 180—65 |
| 3,115,204 | 12/1963 | Dence | 180—10 |

FOREIGN PATENTS

| 426,063 | 3/1935 | Great Britain. |
| 540,273 | 3/1956 | Italy. |

LEO FRIAGLIA, *Primary Examiner.*

MILTON L. SMITH, BENJAMIN HERSH, *Examiners.*